United States Patent [19]

Swearingen et al.

[11] Patent Number: 5,385,507
[45] Date of Patent: Jan. 31, 1995

[54] TWIST TENSIONER WITH SELECTIVELY ENGAGEABLE COUPLING

[75] Inventors: Terry L. Swearingen, Wyanet; David W. Mueller, Neponset, both of Ill.

[73] Assignee: Martin Engineering Company, Neponset, Ill.

[21] Appl. No.: 147,692

[22] Filed: Nov. 4, 1993

[51] Int. Cl.$^6$ .................. F16H 57/00; F16D 3/72
[52] U.S. Cl. .................. 474/92; 474/109; 474/110; 474/111; 464/97; 464/160
[58] Field of Search .................. 474/92, 109, 110, 111, 474/101; 198/499, 813; 464/23, 55, 56, 70, 97, 160, 161, 182

[56] References Cited

U.S. PATENT DOCUMENTS

| | | | |
|---|---|---|---|
| 2,867,102 | 1/1959 | Williams | 464/88 |
| 2,867,103 | 1/1959 | Williams | 464/88 |
| 3,674,131 | 7/1972 | Matson | 198/499 |
| 3,888,345 | 6/1975 | Mitchell | 474/92 X |
| 3,949,805 | 4/1976 | Hazelett et al. | 198/813 X |
| 4,171,920 | 10/1979 | Kramer et al. | 403/223 |
| 4,249,650 | 2/1981 | Stahura | 198/499 |
| 4,280,768 | 7/1981 | Pardue, Jr. et al. | 403/337 X |
| 4,402,394 | 9/1983 | Stoll | 198/499 |
| 4,533,035 | 8/1985 | Reiter | 198/499 |
| 4,533,036 | 8/1985 | Gordon | 198/499 |
| 4,643,293 | 2/1987 | Swinderman | 198/497 |
| 4,664,250 | 5/1987 | Jakobs | 198/499 |
| 4,696,382 | 9/1987 | Aho | 403/1 X |
| 4,854,443 | 8/1989 | Gordon | 198/499 |
| 4,925,434 | 5/1990 | Swinderman et al. | 474/101 |
| 4,995,851 | 2/1991 | Taylor et al. | 474/101 |
| 5,088,965 | 2/1992 | Swinderman et al. | 474/101 |
| 5,149,305 | 9/1992 | Gordon | 474/101 |
| 5,201,402 | 4/1993 | Mott | 198/499 |
| 5,222,588 | 6/1993 | Gordon | 198/499 |
| 5,301,797 | 4/1994 | Hollyfield et al. | 198/499 |

Primary Examiner—Roger J. Schoeppel
Attorney, Agent, or Firm—Lee, Mann, Smith, McWilliams, Sweeney & Ohlson

[57] ABSTRACT

A tensioning device for imparting torsional bias to a shaft. The tensioning device includes an adapter member connectable to the shaft for conjoint rotation therewith. A first hub member is selectively rotationally engageable with the adapter member. A first coupling member is attached to the first hub and a second coupling member is attached to the adapter member. The coupling members provide selective rotational engagement of the first hub member to the adapter member such that the first hub member and the adapter member are relatively rotatable with respect to one another through a preselected degree of relative rotation and such that the first hub member is engageable with the adapter member upon sufficient relative rotation of the first hub member in a first rotational direction with respect to the adapter member such that further rotation of the first hub member provides a corresponding rotation of the adapter member in the first rotational direction. A second hub member is rotatable with respect to the first hub member. A torsion tube of resilient material connected to the first hub member and to the second hub member. A locking mechanism selectively connects the second hub member to a fixed frame to prevent rotation of the second hub member in at least one rotational direction.

7 Claims, 3 Drawing Sheets

TWIST TENSIONER WITH SELECTIVELY ENGAGEABLE COUPLING

BACKGROUND OF THE INVENTION

The present invention relates to a tensioning device for imparting torsional bias to a member such as a shaft and in particular to a tensioning device which will selectively rotationally engage and disengage from the shaft.

The present tensioning device has been found to be particularly useful in connection with conveyor belt cleaners which utilize one or more scraper blades to clean the belt of a Conveyor mechanism. Conveyor belt scraper blades are conventionally mounted on a shaft which is located transverse to the direction of conveyor belt travel. The blades are rotated by the shaft into contact with the belt to scrape off adherent material. Over time the scraper blades wear down and lose contact with the belt thereby hampering the scraper blade's cleaning ability. The shaft on which the scraper blades are mounted must be rotated to reposition the scraper blades against the belt. Various types of tensioning devices have been used in connection with conveyor belt cleaners in order to rotate the shaft and reposition the scraper blades against the belt as the blades wear.

The torsional force for providing rotation of the shaft as the scraper blades wear is typically stored in a resilient torsion coupling member which is twisted about its longitudinal axis. The rotational biasing force stored in the torsional coupling member is typically created by a human operator applying a rotational force to the drive end of the tensioning device with a wrench or other implement in a desired rotational direction. This rotational force applied by the operator is resisted by the engagement of the tips of the scraper blades with the conveyor belt and the underlying head pulley of the conveyor mechanism such that the respective ends of the torsion coupling member twist relative to one another. A serious and potentially injurious problem is encountered when a splice in the conveyor belt or other belt inconsistency or a piece of adherent material being conveyed catches or grabs the tips of the scraper blades and pulls the scraper blades through the gap between the shaft and the conveyor belt thereby providing a large and sudden rotation of the shaft. When such a "pull-through" of the scraper blades occurs, the corresponding rotation of the shaft transmits rotational forces to the drive end of the tensioning device and to the operator thereby potentially causing serious injury to the operator.

SUMMARY OF THE INVENTION

The present invention provides a tensioning device for imparting torsional bias to a shaft. The tensioning device includes an adapter member connectable to the shaft for conjoint rotation therewith. A first hub member is selectively rotationally engageable with the adapter member. A first coupling member is attached to the first hub and a second coupling member is attached to the adapter member. The coupling members provide selective rotational engagement of the first hub member to the adapter member such that the first hub member and the adapter member are relatively rotatable with respect to one another through a preselected degree of relative rotation and such that the first hub member is engageable with the adapter member upon sufficient relative rotation of the first hub member in a first rotational direction with respect to the adapter member such that further rotation of the first hub member provides a corresponding rotation of the adapter member in the first rotational direction. The first coupling member includes a first lug attached to the first hub member and the second coupling member includes a second lug attached to the adapter member. The lugs are adapted to engage one another upon sufficient relative rotation of the first hub member with respect to the adapter member. A second hub member is rotatable with respect to the first hub member. A torsion coupling member of resilient material includes a first end connected to the first hub member and a second end connected to the second hub member. A locking mechanism selectively connects the second hub member to a fixed frame to prevent rotation of the second hub member in at least one rotational direction. The locking mechanism includes a plurality of teeth arranged in a generally circular configuration around the perimeter of the second hub member and a pin having a tip biased into engagement with the teeth. The tip prevents rotation of the second hub member in a second rotational direction opposite to the first rotational direction while allowing rotation of the second hub member in the first rotational direction. The pin is selectively adjustable such that rotation of the second hub member may be prevented in either the first rotational direction or the second rotational direction as desired.

Rotation of the second hub member in the first rotational direction rotates the first hub member into engagement with the adapter member. Further rotation of the second hub member in the first rotational direction rotates the shaft in the first rotational direction to a desired position wherein the tips of the scraper blades contact the conveyor belt. Further rotation of the second hub member in the first rotational direction rotates the second hub member with respect to the first hub member and thereby stores a torsional biasing force in the torsion coupling member. However, relative rotation of the adapter member in the first rotational direction with respect to the first hub member disconnects the driving rotational connection between the adapter member and the first hub member.

DESCRIPTION OF THE DRAWINGS

FIG. 6 is a cross sectional view of the locking mechanism.

DESCRIPTION OF THE PREFERRED EMBODIMENT

Figure 1:
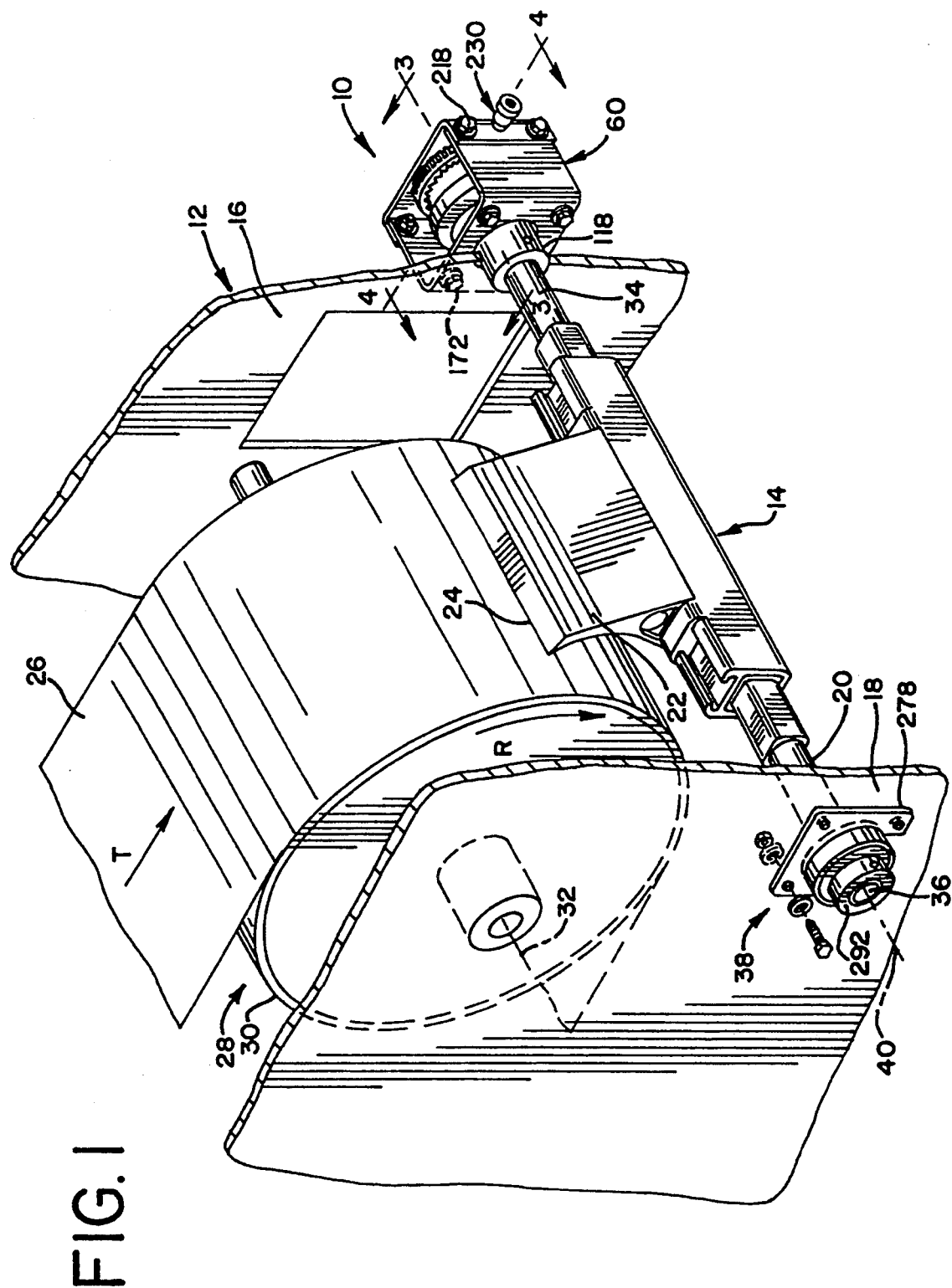
FIG. 1 is a perspective view of the tensioning device shown installed with a conveyor belt cleaner.

The tensioning device 10 of the present invention is shown in FIG. 1 connected at one end to a stationary conveyor chute 12 and at a second end to a shaft 20 on which a conveyor belt cleaner 14 is supported. The belt cleaner 14 is shown as a primary conveyor belt cleaner, however, the tensioning device 10 may also be used with secondary conveyor belt cleaners of the types illustrated in U.S. Pat. Nos. 4,249,650 and 4,643,293 which are owned by applicant Martin Engineering Co. The chute 12 includes a first wall 16 and an opposing and spaced apart second wall 18. The belt cleaner 14 includes a cross-shaft 20 and one or more scraper blades 22 mounted thereon. The shaft 20 may be made from circular pipe, rectangular tubing, a combination of circular pipe and rectangular tubing, or other shapes as desired. Each scraper blade 22 includes a scraping edge 24 adapted to contact the belt 26 of a conveyor mechanism 28 to remove adherent material from the belt 26. As shown in FIG. 1, the conveyor belt 26 extends around a head pulley 30 which rotates about an axis 32 in a direction shown by the arrow "R". The rotation of the pulley 30 causes the belt 26 to travel in a direction as generally indicated by the arrow "T".

The shaft 20 extends between a first end 34 and a second end 36 and is located generally transverse to the direction of conveyor belt travel "R" and generally parallel to the axis 32 about which the pulley 30 rotates. The first end 34 of the shaft 20 is rotatably mounted to the first wall 16 of the chute 12 by the tensioning device 10. The second end 36 of the shaft 20 is rotatably mounted to the second wall 18 of the chute 12 by a bearing assembly 38. The shaft 20 is rotatable about a longitudinal axis 40 such that the scraping edges 24 of the scraper blades 22 may be rotated into or out of contact with the conveyor belt 26.

Figure 2:
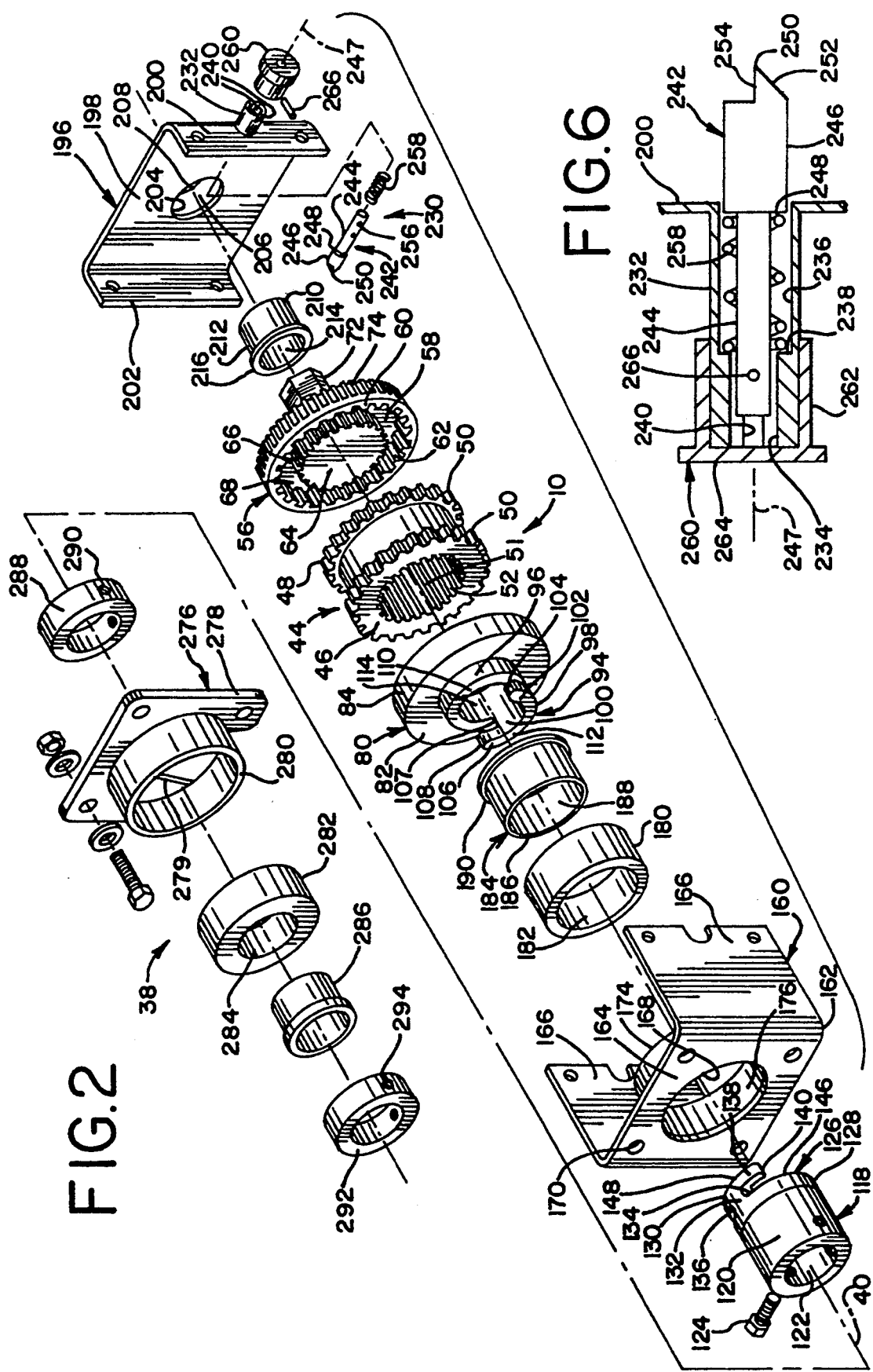
FIG. 2 is an exploded view of the tensioning device and of the bearing assembly.

The tensioning device 10 includes a resilient torsion coupling member such as a torsion tube 44 best shown in FIG. 2. The torsion tube 44 includes a first flange 46 at one end and a second flange 48 at the opposite end. Each flange 46 and 48 includes a saw-tooth shaped outer perimeter forming a plurality of radially outwardly extending teeth 50. A bore 51 extends longitudinally through the flanges 46 and 48 and the torsion tube 44 forming an interior wall having a plurality of radially inwardly extending longitudinal ribs 52 spaced around the perimeter of the interior wall. The diameter of the bore is sized larger than the diameter of the shaft 20. The diameter of the torsion tube 44 and the thickness of the wall of the torsion tube 44 may be varied as desired. The length of the torsion tube 44 may also be varied as desired. The torsion tube 44 is preferably formed in the shape of a hollow tube but may also be formed as a solid element. The torsion tube 44 is preferably made of a resilient material such as rubber having a hardness of 60 Shore A. The torsion tube 40 may also be made of other materials such as polyurethane if desired, and also in other hardnesses.

A drive hub 56 is connected to the second flange 48 of the torsion tube 44. The drive hub 56 includes a circular end wall 58 and a cylindrical wall 60 extending around the perimeter of the end wall 58. The cylindrical wall 60 includes a saw-tooth shaped interior surface forming a plurality of radially inwardly extending teeth 62. A generally circular central hub 64 is attached to the interior surface of the end wall 58 concentrically within the cylindrical wall 60. The central hub 64 includes a plurality of radially outwardly extending teeth 66 arranged in a generally circular pattern about the perimeter of a central hub 64. The central hub 64 and the circular wall 60 form a circular groove 68 therebetween. The second flange 48 of the torsion tube 44 is adapted to fit within the circular groove 68 such that the teeth 50 on the second flange 48 matingly engage the inwardly extending teeth 62 of the cylindrical wall 60 and the internal ribs 52 of the torsion tube 44 matingly engage the teeth 66 extending outwardly from the central hub 64. The torsion tube 44 and the drive hub 56 are thereby rotationally engaged to one another such that rotation of the drive hub 56 about the axis 40 will provide a corresponding rotation of the second flange 48 of the torsion tube 44. A stem 70 extends longitudinally from the exterior surface of the end wall 58 and is located concentrically about the axis 40. The stem 70 includes a cylindrical portion 71 attached to the end wall 58 and a hexagonal end 72 for rotational engagement with a wrench, ratchet or other implement. The drive hub 56 also includes a plurality of radially outwardly extending teeth 74 arranged in a generally circular pattern around the perimeter of the cylindrical wall 60.

The tensioning device 10 also includes a driven hub 80. The driven hub 80 includes a circular end wall 82 and a cylindrical wall 84 which extends around the perimeter of the end wall 82. The cylindrical wall 84 includes a plurality of radially inwardly extending teeth 86. A central hub 88 is concentrically located within the cylindrical wall 84 and is connected to the interior surface of the end wall 82. The central hub 88 is generally circular and includes a plurality of radially outwardly extending teeth 90 which are arranged in a generally circular pattern around the perimeter of the central hub 88. The central hub 88 and the circular wall 84 form a circular groove 92 therebetween adapted to receive the first flange 46 of the torsion tube 40 such that the teeth 50 of the second flange 48 matingly engage the inwardly extending teeth 86 of the drive hub 80 and such that the internal ribs 52 of the torsion tube 44 matingly engage the outwardly extending teeth 90 of the central hub 88. The second flange 48 of the torsion tube 44 is thereby rotationally engaged to the driven hub 80 such that rotation of the driven hub 80 about the axis 40 will cause a corresponding rotation of the second flange 48 of the torsion tube 44.

A coupling member 94 is concentrically attached to the outer surface of the end wall 82 of the driven hub 80. The coupling member 94 includes a cylindrical base 96 which is attached to the end wall 82 of the driven hub 80 concentrically about the axis 40. A generally T-shaped lug 98 extends longitudinally from the cylindrical base 96. The T-shaped lug 98 is arcuately shaped such that it follows a uniform radius from the axis 40. The T-shaped lug 98 includes an arcuate stem 100 which projects longitudinally outwardly from the base 96. A first wing member 102 extends arcuately from a first side 103 of the stem 100 to a tip 104. The wing member 102 is longitudinally spaced apart from the base 96 forming a slot therebetween. A second wing member 106 extends arcuately from a second side 107 of the stem 100 to a tip 108. The wing member 106 is spaced longitudinally apart from the cylindrical base 96 forming a slot therebetween. The base 96 includes a circular end wall 110 which extends between the first side 103 of the stem 100 to the second side 107 of the stem 100. The stem 100 extends around the cylindrical base 96 through an angle of approximately 113° between the first and second sides 103 and 107 as measured about the central axis 40 in a plane perpendicular to the axis 40. The T-shaped lug 98 includes an arcuate end wall 112 which extends from the tip 104 of the first wing member 102 to the tip 108 of the second wing member 106. A cylindrical bore 114 extends through the coupling member 94 and the end wall 82 and central hub 88 of the driven hub 80.

The tensioning device 10 also includes an adapter member 118 having a cylindrical outer surface 120 and a cylindrical bore 122 extending through the adapter member 118. The bore 122 is adapted to fit closely around the first end 34 of the shaft 20 for selective engagement thereto. The bore 122 may be in various other shapes as required to mate with the shaft 20. The adapter member 118 is selectively connected to the shaft 20 for conjoint rotation about the axis 40 by a plurality of set screws 124 which are threadably engaged to the adapter member 118.

A coupling member 126 which is constructed similarly to the coupling member 94 is attached to the inner end of the adapter member 118. The coupling member 126 includes a cylindrical base 128 which is attached to the adapter member 118 and concentrically located about the axis 40. A generally T-shaped lug 130 extends longitudinally from the cylindrical base 128. The T-shaped lug 130 is arcuate shaped such that it follows a uniform radius from the axis 40. The T-shaped lug 130 includes a stem 132 which extends longitudinally outwardly from the base 128 and arcuately between a first side 134 and a second side 136. A first wing member 138 extends arcuately from the first side 134 of the stem 132 to a tip 140. The first wing member 138 is longitudinally spaced apart from the base 128 forming a slot therebetween. A second wing member 142 extends arcuately from the second side 136 of the item 132 to a tip 144. The second wing member 142 is longitudinally spaced apart from the base 128 forming a slot therebetween. The base 128 includes a circular end wall 146 which extends from the first side 134 of the stem 132 to the second side 136 of the stem 132. The stem 132 extends arcuately between the first side 1.34 and the second side 136 an angle of 48° with a uniform radius from the axis 40 as measured about the central axis 40 in a plane perpendicular to the axis 40. The T-shaped lug 130 includes an arcuate end wall 148 which extends between the tip 140 of the first wing member 138 and the tip 144 of the second wing member 142. A cylindrical bore 122 extends through the adapter member 118 and the coupling member 126.

The tensioning device 10 includes a housing 160 which is selectively connected to the external surface of the first wall 16 of the conveyor chute 12. The housing 160 includes a generally U-shaped bracket 162 having a center wall 164 and two side walls 166 extending from opposite ends of the center wall 164 parallel to one another. The center wall 164 includes a central circular aperture 168 and a plurality of apertures 170 adapted to receive fasteners 172 for connecting the U-shaped bracket 162 to the conveyor chute 12. A cylindrical sleeve 174 having a bore 176 is attached to the internal surface of the center wall 164 concentrically about the central aperture 168. The diameter of the bore 176 is slightly larger in diameter than the diameter of the central aperture 168 such that the center wall 164 provides a circular lip 178.

A generally cylindrical shock ring 180, preferably made of rubber or other resilient materials, is located within the sleeve 174 and abuts against the lip 178 of the center wall 164. The shock ring 180 includes a circular bore 182. A bushing 184 includes a cylindrical wall 186 forming a bore 188 therein and an outwardly extending lip 190. The cylindrical wall 186 of the bushing 184 is located within the bore 182 adjacent to the shock ring 180 such that the lip 190 engages an inner end of the shock ring 180. The coupling member 94 and the coupling member 126 are rotatably located within the bore 188 of the bushing 184. The bushing 184 is preferably made of nylon or ultra high molecular weight polyethylene to provide a low-friction rotational support for the adapter member 118 and the driven hub 80 which are connected to the coupling members 94 mid 126. The diameter of the central aperture 168 in the bracket 162 is larger in diameter than the external diameter of the adapter member 118 such that the adapter member 118 may move in directions radial to the axis 40 within the aperture 168 in response to shock forces applied to the shaft 20. The shock forces which cause the radial movements of the adapter member 118 are absorbed by the shock ring 180.

The housing 160 also includes a second generally U-shaped bracket 196 having a center wall 198, a first side wall 200 and a second side wall 202. The first and second side walls 200 and 202 extend from opposite ends of the center wall 198 generally parallel to one another. The center wall 198 includes a circular central aperture 204. A cylindrical sleeve 206 best shown in FIG. 3 has a bore 208 attached to the outer surface of the center wall 198 concentrically about the central aperture 204. The bore 208 in the sleeve 206 and the central aperture 204 in the center wall 198 are preferably of the same diameter. A bushing 210 includes a generally cylindrical wall 212 forming a bore 214 therein and a lip 216 extending outwardly from one end of the cylindrical wall 212. The cylindrical wall 212 of the bushing 210 is located within the bore 208 of the sleeve 206 in close engagement thereto. The cylindrical portion 71 of the stem 70 of the drive hub 56 extends within the bore 214 of the bushing 210 for rotation therein. The hexagonal end 72 of the stem 70 is located outside of the housing 160 and is easily accessible such that a wrench or other implement may be easily attached to the hexagonal end 72. The bushing 210 is preferably made of nylon or ultra high molecular weight polyethylene to provide a low friction rotational support to the drive hub 56. The U-shaped bracket 196 is selectively connectable to the U-shaped bracket 162 by fasteners 218 as shown in FIG. 1.

The tensioning device 10 also includes a locking mechanism 230 for selectively connecting the drive hub 56 to the housing 160 and conveyor chute 12. The locking mechanism 230, as best shown in FIGS. 2 and 6, includes a cylindrical sleeve 232 attached to the first side wall 200 of the U-shaped bracket 196. The sleeve 232 includes a first bore 234 which extends into the cylindrical sleeve 232 from its outer end. A second bore 236 extends through the first wall 200 of the U-shaped bracket 196 and into the opposite end of the cylindrical sleeve 232. The bore 236 is larger in diameter than the bore 234 such that the bores 234 and 236 form a lip 238 within the cylindrical sleeve 232. The cylindrical sleeve 232 also includes two longitudinally extending diametrically opposed slots 240 in the outer end of the cylindrical sleeve 232.

The locking mechanism 230 also includes a pin 242 having a first cylindrical shaft of a first diameter connected to a second cylindrical shaft 246 of a second and larger diameter. The shafts 244 and 246 have a common longitudinal axis 247. The shafts 244 and 246 form an outwardly extending circular lip 248. The second cylindrical shaft 246 terminates in a tip 250 formed by a sloped wall 252 and a generally horizontal wall 254 which is generally parallel to the axis 247. The sloped wall 252 and the horizontal wall 254 are located at an angle of approximately 45° to one another. A bore 256 extends transversely through the first shaft 244.

Figure 4:
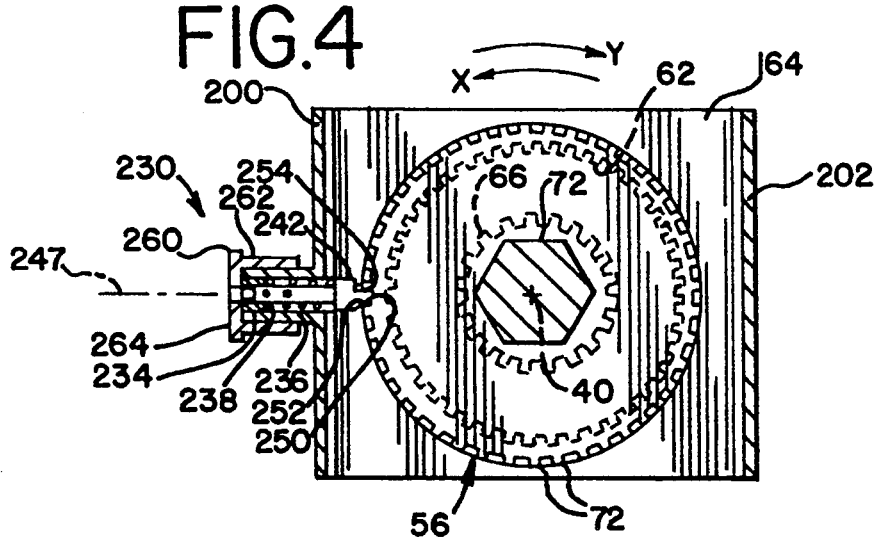
FIG. 4 a cross sectional view of the,tensioning device taken along lines 4—4 of FIG. 1.

A resilient biasing member such as a spring 258 as illustrated in FIGS. 2 and 4 is located around the first cylindrical shaft 244. The pin 242 and the spring 258 are inserted into the second bore 246 of the cylindrical sleeve 232 such that the spring 258 is compressed between the lip 238 in the cylindrical sleeve 232 and the lip 248 of the pin 242. A knob 260 having a cylindrical wall 262 and an end wall 264 is placed around the outer end of the cylindrical sleeve 232 such that the cylindrical sleeve 232 extends within the cylindrical wall 262. A pin 266 extends through the cylindrical wall 262 of the knob 260, through the slots 240 in the cylindrical sleeve 232 and through the bore 256 in the pin 242 thereby connecting the knob 260 to the pin 242. The location of the pin 266 within the slots 240 prevents rotation of the pin 242 about the axis 247. The spring 258 resiliently biases the pin 242 and the tip 250 from a retracted position to an extended position wherein the tip 250, as shown in FIG. 4, is located between adjacent teeth 74 of the drive hub 56.

As shown in FIG. 4, the pin 242 will prevent rotation of the drive member 56 in the counterclockwise rotational direction shown by the arrow "R" while allowing rotational movement of the drive member 56 in the opposite rotational direction as shown by the arrow "R" as will be more fully described herein. The orientation of the sloped wall 252 and horizontal wall 254 of the pin 242 may be reversed by pulling outwardly on the knob 260 until the pin 266 is removed from the slots 240 in the cylindrical sleeve 232 whereupon the knob 260 in the pin 242 may be rotated 180° and then released such that the pin 256 will relocate within the slots 240. Various other types of locking mechanisms such as set screws, worm gears or other ratchet arrangements may be used as desired to selectively prevent rotation of the drive hub 56.

The beating assembly 38, as best shown in FIG. 2, includes a mounting member 276 which is selectively connectable to the second wall 18 of the conveyor chute 12. The mounting member 276 includes a plate 278 having a generally V-shaped notch 279 and a cylindrical sleeve 280 mounted to the exterior of the plate 278. A cylindrical shock ring 282 having a bore 284 is located within the cylindrical sleeve 280. A bushing 286 preferably made of nylon or ultra high molecular weight polyethylene, which is substantially identical to the bushing 210, is inserted into the bore 284 of the shock ring 282. The second end 36 of the shaft 20 extends through the bushing 286 such that the bushing 286 provides a low-friction rotational support for the shaft 20 and such that the shock ring 282 absorbs radial movements of the shaft 20 due to shock forces which are applied to the shaft 20. A locking collar 288 extends around the shaft 20 and is located closely adjacent to the second wall 18 of the conveyor chute 12. The locking collar 288 is selectively connected to the shaft 20 by a pair of set screws 290 which are threadably engaged to the locking collar 288. A locking collar 292 extends around the shaft 20 and is located outside the conveyor chute 12 adjacent to the bushing 286. The locking collar 292 is selectively connected to the shaft 20 by a pair of set screws 294 which are threadably engaged to the locking collar 292. The locking collars 288 and 292 limit the longitudinal movement of the shaft 20 along the axis 40.

In operation, the tensioning device 10 is fastened to the exterior of the first wall 16 of the conveyor chute 12 and the beating assembly 38 is fastened to the exterior surface of the second wall 18 of the conveyor chum 12. The second end 36 of the shaft 20 is inserted through the locking collar 288 and through the bushing 286 of the beating 38. The first end 34 of the shaft 20 is then inserted into the bore 122 of the adapter member 118. The first end 34 of the shaft 20 may be positioned longitudinally along the axis 40 by sliding the first end 34 through the adapter member 118, the coupling member 126, the coupling member 94, the driven hub 80 and the torsion tube 44 as desired until the first end 34 of the shaft 20 engages the central hub 64 of the drive hub 56. The shaft 20 may thereby be moved back and forth along the axis 40 as required to properly position the scraper blades 22 against the conveyor belt 26. The adapter member 118 is connected to the first end 34 of the shaft 20 by the set screws 124 for conjoint rotation therewith. The locking collar 292 is placed over the second end 36 of the shaft 20 adjacent to the bushing 286 and is connected to the shaft 20 by the set screws 294. The locking collar 288 is positioned adjacent to the second wall 18 of the conveyor chum 12 and is connected to the shaft 20 by the set screws 290. The locking collars 288 and 292 may be positioned on the shaft 20 as desired to selectively limit the amount of longitudinal movement of the shaft 20 along the axis 40 as is desired to be permitted. The shaft 20 rotates within and is supported by the bushings 184 and 286.

Figure 3:
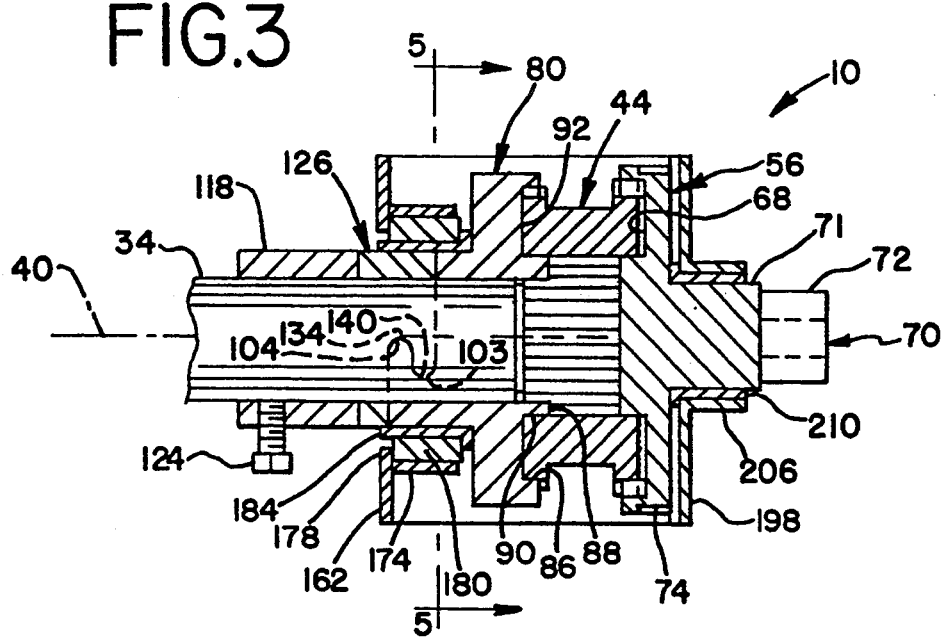
FIG. 3 is a cross sectional view of the tensioning device taken along lines 3—3 of FIG. 1
Figure 5:
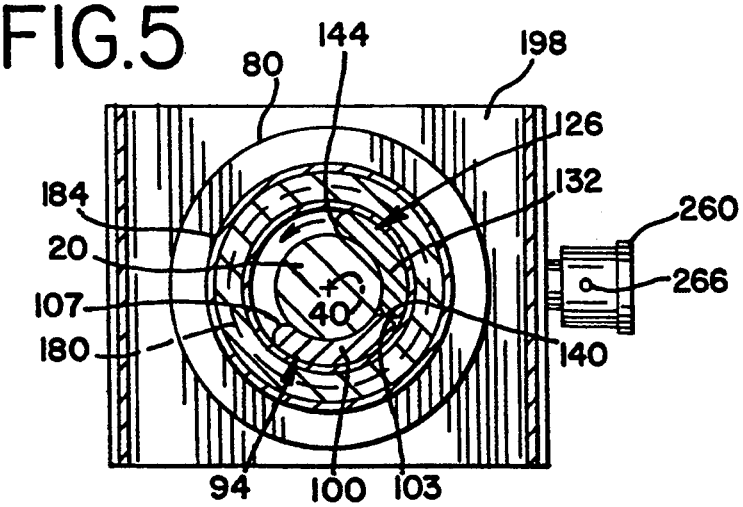
FIG. 5 is across sectional view of the tensioning device taken along lines 5—5 of FIG. 3.

In order to bias the scraper blades 22 into engagement with the conveyor belt 26, a wrench, socket wrench or similar device is applied to the hexagonal end 72 of the drive hub 56 by an operator and the operator rotates the drive hub 56 in a clockwise rotational direction as shown by the arrow Y in FIG. 4. Rotation of the drive hub 56 in the clockwise direction Y will cause a corresponding rotation of the driven hub 80 and the coupling member 94 in the same rotational direction. As best shown in FIGS. 3 and 5, upon sufficient rotation of the drive hub 56, driven hub 80 and coupling member 94, the first side 103 of the stem 100 of the coupling member 94 will engage the tip 140 of the first wing member 138 of the coupling member 126 and the tip 104 of the first wing member 102 of the coupling member 94 will engage the first side 134 of the stem 132 of the coupling member 126, such that further rotation of the coupling member 94 in the clockwise direction Y will produce a corresponding rotation of the coupling member 126, the adapter member 118 and the shaft 20 in the same rotational direction Y until the scraping edges 24 of the scraper blades 22 engage the conveyor belt 26.

Once the scraper blades 22 are in engagement with the conveyor belt 26, further rotation of the drive hub 56 in the clockwise rotational direction Y by the operator will cause the drive hub 56 to rotate relative to the driven hub 80, as the driven hub 80 will be held relatively stationary by the engagement of the scraper blades 22 against the belt 26. As the drive hub 56 is rotated with no corresponding rotation of the driven hub 80, the torsion tube 40 will twist about the axis 40 and a torsional biasing force is input into the torsion tube 44. The torsional biasing force which is input and stored within the torsion tube 44 is applied to the shaft 20 through the engagement of the coupling member 94 with the coupling member 126.

As the drive hub 56 is rotated in the clockwise direction Y, the outwardly extending teeth 74 on the drive hub 56 will press against the sloped wall 252 of the pin 242 of the locking mechanism 230. A tooth 74 will slide along the sloped wall 252 towards the tip 250 while simultaneously sliding the pin 242 longitudinally to the left as shown in FIG. 4 along the axis 247 away from the drive hub 56 until the tooth 74 passes beyond the tip 250, whereupon the spring 258 will bias the tip 250 back towards the drive hub 56 such that the sloped wall 252 and horizontal wall 254 of the pin 242 will again be located between adjacent teeth 74 of the drive hub 56. The locking mechanism 230 thereby allows the drive hub 56 to be rotated in the clockwise direction Y as shown in FIG. 4 when the pin 242 is orientated as shown.

While the locking mechanism 230 as shown in FIG. 4 allows rotation of the drive hub 56 in the clockwise direction Y, it prevents rotation of the drive member 56 in a counterclockwise direction as shown by the arrow X. Once a torsional biasing force has been input into the torsion tube 44, the locking mechanism 230 will prevent the rotation of the drive hub 56 in the counterclockwise direction X by the engagement of a tooth 74 on the drive hub 56 with the horizontal wall 254 of the pin 242. As the tooth 74 and the horizontal wall 254 are generally parallel to one another, the engagement of the tooth 74 against the horizontal wall 254 will not retract the pin 242 to allow the tooth 74 to pass by the tip 250. If desired, the orientation of the pin 242 may be reversed from that shown in FIG. 4 by pulling outwardly on the knob 260 until the pin 266 is removed from the slots 240 in the cylindrical sleeve 232 whereupon the knob 260 and pin 242 are rotated 180°. The pin 266 is then reinserted into the slots 240. In this rotated position (not shown) the locking mechanism 230 will allow rotation of the drive hub 56 in a counterclockwise direction as shown by the arrow X in FIG. 4 and will prevent rotation of the drive hub 56 in a clockwise direction as shown by the arrow Y in FIG. 4.

As the scraping edges 24 of the scraper blades 22 wear down due to the scraping engagement with the belt 26, the torsional biasing force stored in the torsion tube 44 will cause the driven hub 80 to rotate the shaft 20 in the clockwise direction Y through the engagement of the coupling member 94 with the coupling member 126 to maintain the scraper blades 22 in scraping engagement with the belt 26.

Under normal conditions the operator will rotate the drive hub 56 relative to the driven hub 80 to store the desired torsional biasing force within the torsion tube 44 and to press the scraper blades 22 against the conveyor belt 26 with the desired amount of force. However, as the operator is applying a rotational force to the drive hub 56 with a wrench or other device, a sudden "pull-through" may occur in which the belt 26 grabs the scraper blades 22 and pulls the scraper blades 22 in the rotational direction Y between the head pulley 30 and the shaft 20. Such "pull-throughs" result in a large and sudden rotation of the shaft 20 in the clockwise direction Y. When a "pull-through" occurs, the shaft 20 rotates in the clockwise direction Y and the torsional biasing force stored in the torsion tube 44 causes a corresponding rotation of the driven hub 80 and coupling member 94 in the clockwise direction Y. However, once the driven hub 80 has sufficiently rotated in the clockwise direction Y such that the torsional biasing force stored within the torsion tube 44 is exhausted and the tube 44 is no longer twisted, the driven hub 80 and the coupling member 94 will not further rotate in the clockwise direction Y, although the shaft 20 will continue to further rotate in the clockwise direction Y, as the coupling member 126 will disengage from the coupling member 94. During a "pull-through" the coupling member 126 will disengage from the coupling member 94 before a rotational force in the clockwise direction can be applied by the shaft 20 to the coupling member 94, which would otherwise cause the drive hub 56 to rotate in the clockwise direction Y while the operator is applying a wrench thereto, which rotational force could otherwise cause serious injury to the operator.

As best shown in FIG. 5, there is a limited degree of relative rotation in the clockwise direction Y through which the coupling member 126 can rotate about the axis 40 before the tip 144 of the second wing member 142 of the coupling member 126 will engage the second side 107 of the stem 100 of the coupling member 94 such that further rotation of the coupling member 126 in the clockwise direction Y will cause a corresponding clockwise rotation of the coupling member 94. The amount of relative rotation which is permitted between the coupling members 94 and 126 may be adjusted by varying the widths of the stems 100 and 132 and the distance between the tips 104 and 108 of the coupling member 94 and the distance between the tips 140 and 144 of the coupling member 126. The coupling members 94 and 126 may thereby be used to transmit a rotational force in either a clockwise or counterclockwise direction as desired while permitting disengagement of the coupling members through a selected degree of rotation of one coupling member 94 or 126 relative to the other. The tensioning device 10 may therefore be used to apply a torsional biasing force to a shaft 20 in either a clockwise direction shown by the arrow Y in FIG. 4 or in a counterclockwise direction as shown by the arrow X.

Various features of the invention have been particularly shown and described in connection with the illustrated embodiments of the invention, however, it must be understood that these particular arrangements merely illustrate and that the invention is to be given its fullest interpretation within the terms of the appended claims.

What is claimed is:

1. A tensioning device for imparting torsional bias to a shaft including an adapter member connectable to the shaft for conjoint rotation therewith; a first hub member selectively rotationally engageable with said adapter member; means for providing selective rotational engagement of said first hub member to said adapter member such that said first hub member and said adapter member are relatively rotatable with respect to one another through a preselected degree of relative rotation and such that said first hub member is engageable with said adapter member upon sufficient relative rotation of said first hub member with respect to said adapter member such that further rotation of said first hub member provides a corresponding rotation of said adapter member; a second hub member rotatable with respect to said first hub member; a torsion coupling member of resilient material having a first end connected to said first hub member and a second end connected to said second hub member; and means for selectively connecting said second hub member to a fixed frame to prevent rotation of said second hub member in at least one rotational direction; whereby rotation of said second hub member in a first rotational direction rotates said first hub member into engagement with said adapter member and thereby rotates the shaft in said first rotational direction to a desired position whereupon further rotation of the second hub member in said first rotational direction operates to store a torsional biasing force in said coupling member when said second hub member is rotated with respect to said first hub member and such that relative rotation of said adapter member in said first rotational direction with respect to said first hub member disconnects said adapter member from said first hub member.

2. The tensioning device of claim 1 wherein said selective rotational engagement means comprises a first coupling member attached to said first hub member and a second coupling member attached to said adapter member, said coupling members being adapted to engage one another upon sufficient relative rotation of said first hub member in said first rotational direction with respect to said adapter member and thereby provide selective corresponding rotation of said first hub member and said adapter member, and being adapted to disengage from one another when said adapter member relatively rotates in said first direction with respect to said first hub member to allow relative rotation between said first hub member and said adapter member.

3. The tensioning device of claim 2 wherein each said coupling member includes a generally T-shaped lug having a stem, a first wing member extending from a first side of said stem, and a second wing member extending from a second side of said stem, such that said T-shaped lugs selectively interlock with one another.

4. The tensioning device of claim 1 wherein said selective connecting means comprises a plurality of teeth arranged in a generally circular configuration around the perimeter of said second hub member.

5. The tensioning device of claim 4 wherein said selective connecting means includes a pin having a tip in engagement with said teeth, said tip preventing rotation of said second hub member in a second rotational direction while allowing rotation of said second hub member in said first rotational direction.

6. The tensioning device of claim 5 including means for rotating said pin to control the direction of rotation in which said second hub member is prevented from rotating.

7. The tensioning device of claim 5 wherein said selective connector means includes a resilient member for biasing said tip of said pin into engagement with said teeth on said second hub member.

* * * * *